United States Patent [19]

Nishiyama

[11] Patent Number: 5,157,784
[45] Date of Patent: Oct. 20, 1992

[54] MEMORY CONTROL SYSTEM RESPONSIVE TO DETERMINATION, ALLOCATING ADJACENT TEST SPACE FOR EDITING SPACE, RELOCATING ADJACENT TEXT AND EDITING SELECTED TEXT

[75] Inventor: Masaki Nishiyama, Tokyo, Japan

[73] Assignee: Canon Kabushiki Kaisha, Tokyo, Japan

[21] Appl. No.: 632,643

[22] Filed: Dec. 26, 1990

Related U.S. Application Data

[63] Continuation of Ser. No. 219,877, Jul. 12, 1988, abandoned, which is a continuation of Ser. No. 615,176, May 30, 1984, abandoned.

[30] Foreign Application Priority Data

Jun. 14, 1983 [JP] Japan ................. 58-104964
Jun. 20, 1983 [JP] Japan ................. 58-110356

[51] Int. Cl.⁵ ........................................ G06F 15/40
[52] U.S. Cl. .......................... 395/600; 364/DIG. 1; 364/822; 364/873; 364/833; 364/419; 395/425
[58] Field of Search ... 364/200 MS File, 900 MS File, 364/DIG. 1, DIG. 2, 419; 495/600, 425, 400

[56] References Cited

U.S. PATENT DOCUMENTS

| | | | |
|---|---|---|---|
| 1,509,228 | 9/1924 | Carino | 400/315 |
| 2,379,862 | 7/1945 | Bush | 197/84 |
| 3,248,705 | 4/1966 | Dammann et al. | 395/147 |
| 3,260,340 | 7/1966 | Locklar et al. | 197/19 |
| 3,618,032 | 11/1971 | Goldsberry et al. | 395/148 |
| 3,671,683 | 6/1972 | Rahenkamp et al. | 360/72.2 |
| 3,913,721 | 10/1975 | Koplow et al. | 400/63 |
| 4,028,681 | 6/1977 | Vittorelli | 364/419 |
| 4,198,681 | 4/1980 | Furr et al. | 364/900 |
| 4,212,077 | 7/1980 | Vittorelli | 364/419 |
| 4,240,075 | 12/1980 | Bringol | 340/798 |
| 4,250,560 | 2/1981 | Dethloff et al. | 364/900 |
| 4,264,217 | 4/1981 | De Sieno | 400/63 |
| 4,266,280 | 5/1981 | Heinzl et al. | 395/250 |
| 4,270,182 | 5/1981 | Asija | 364/900 |
| 4,355,913 | 10/1982 | Rutkowski, Jr. | 364/900 |
| 4,357,680 | 11/1982 | Greek, Jr. | 364/900 |
| 4,393,463 | 7/1983 | Aiken | 364/900 |
| 4,441,829 | 4/1984 | Herbert et al. | 364/900 |
| 4,464,730 | 8/1984 | Lawerence et al. | 364/900 |
| 4,495,490 | 1/1985 | Hopper et al. | 340/734 |
| 4,553,860 | 11/1985 | Imaizumi et al. | 364/900 |
| 4,585,360 | 4/1986 | Ueda | 364/900 |
| 4,604,653 | 8/1986 | Shimizu | 358/256 |
| 4,663,731 | 5/1987 | Ikegami et al. | 364/900 |

FOREIGN PATENT DOCUMENTS 0043391 1/1982 European Pat. Off. .
0043392 1/1982 European Pat. Off. .

OTHER PUBLICATIONS

IBM Technical Disclosure Bulletin, "Line Count and Search", McDonald et al., vol. 9 No. 12 May 1967, pp. 1715-1716.

*Primary Examiner*—Thomas C. Lee
*Assistant Examiner*—L. Donaghue
*Attorney, Agent, or Firm*—Fitzpatrick, Cella, Harper & Scinto

[57] ABSTRACT

A memory control unit comprising: a first memory for storing a plurality of text information; a second memory for storing title information to segment those text information stored in the first memory; and control device which reads out the title information in the 2nd memory and the information regarding an empty memory area in the 1st memory and provides the empty area to the location next to the text information which will be changed in the 1st memory. When the empty area in the 1st memory is located behind the text information to be changed, other text information subsequent to that text is shifted to the backward location. When the empty area is located before the text information to be changed, that text is shifted to the forward location.

24 Claims, 8 Drawing Sheets

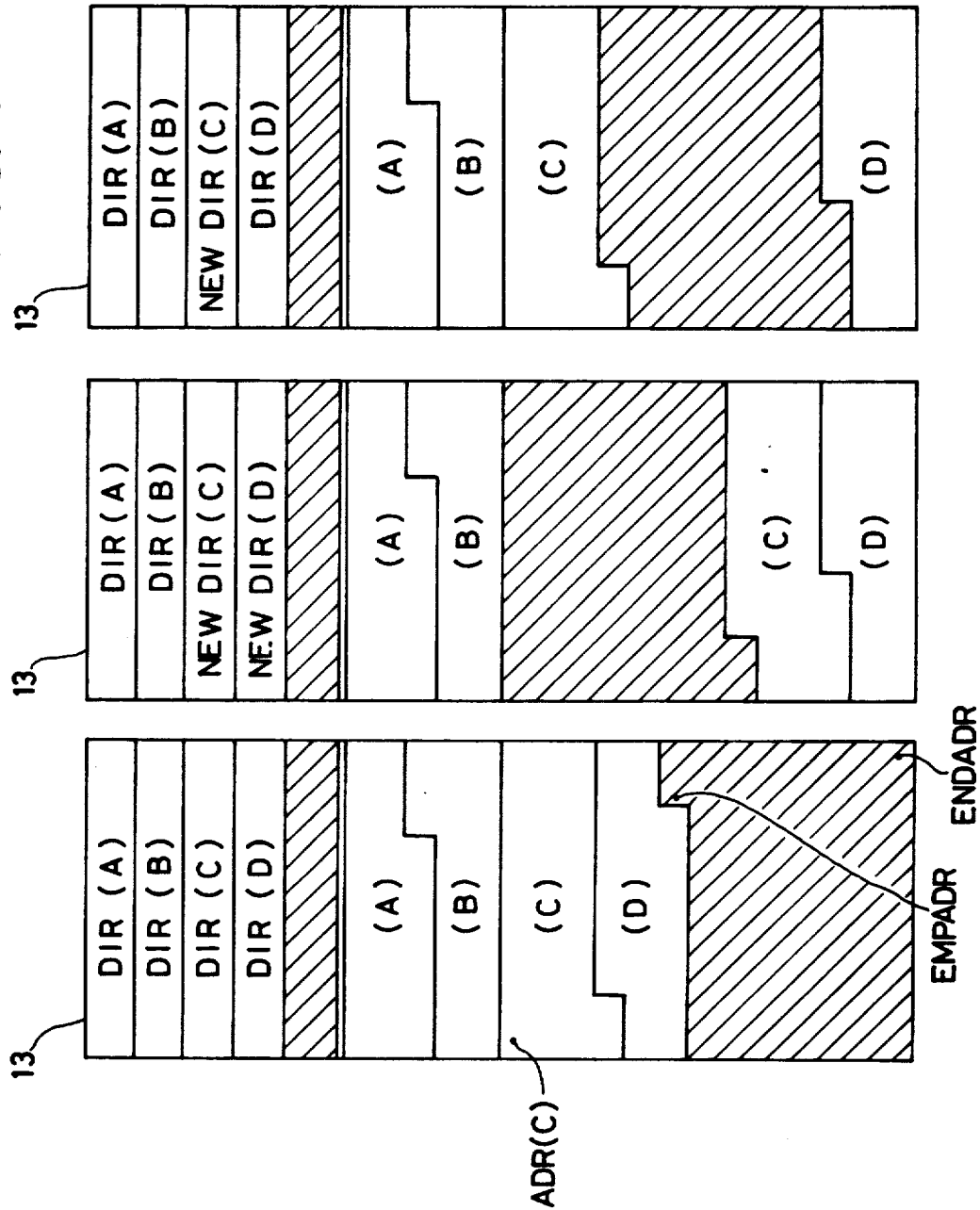

MEMORY CONTROL SYSTEM RESPONSIVE TO DETERMINATION, ALLOCATING ADJACENT TEST SPACE FOR EDITING SPACE, RELOCATING ADJACENT TEXT AND EDITING SELECTED TEXT

This application is a continuation of application Ser. No. 219,877 filed Jul. 12, 1988, now abandoned, which is a continuation of application Ser. No. 615,176 filed May 30, 1984, now abandoned.

BACKGROUND OF THE INVENTION

1. Field of the Invention

The present invention relates to a storage device and, more particularly, to a text memory control unit for use in electronic typewriters or the like.

2. Description of the Prior Art

Recently, typewriters have been electronized and in such electronic typewriters, the operations regarding the keyboard and printer section of mechanical typewriters are electronically controlled, so that various drawbacks in the mechanical typewriters are eliminated and a relatively good sense of key touch is obtained when a key is depressed; furthermore, various kinds of functions are realized.

On the other hand, a memory is used to execute various functions in such an electronic typewriter; however, in association with the recent high integration for producing an LSI of a memory device and the reduction in cost of such a device, a low-cost non-volatile memory having a relatively large capacity can be used without using an external storage device such as a floppy disk and this memory is used to store a character string. In the typewriter equipped with such text memories, to sentences or idioms, words, addresses, etc. which are frequently used, titles each of which is constituted by one character or a plurality of characters corresponding to each of them is given. Due to this, a plurality of texts are registered in the memory equipped in the typewriter on the basis of such titles. On the other hand, the texts registered in the memory can be also accessed and printed out. Therefore, very useful electronic typewriters are provided.

However, the conventional text memory control unit has a drawback such that a lot of memories are needed in the case where the texts are rearranged to change, insert or delete the input characters. For example, if the texts stored in a text memory 1 are segmented as shown in FIG. 1, to execute the insertion or deletion of characters in a text (B) in the text memory 1, the (B) is once transferred into a work memory 2 in a central processing unit (hereinbelow, referred to as an MPU) for performing various controls and then texts (C) and (D) are shifted immediately after a text (A). Subsequently, the text (B) which has been temporarily saved in the work memory 2 is transferred right after the text (D). After these series of processings, the contents of text management sections (hereinbelow, referred to as directories DIR(B), DIR(C) and DIR(D)) in which the addresses and the like of the texts (B), (C) and (D) were stored are updated. As described above, the essential drawback in the conventional apparatus is that a great number of work memories are required. In addition, the processing time also depends on a size of this work memory and there is also a drawback such that the processing time will have become remarkably long when its size is small.

As shown in FIG. 2, each directory, e.g., DIR(B) comprises: a title (ID) consisting of eight bytes; a head address (address information section ADR) consisting of two bytes regarding each text; and a significant character number information section (CNT) consisting of two bytes in which the number of characters of the text was memorized. In addition, the texts (A), (B), (C) and (D) are the texts constituted by the codes (for example, ASCII codes) corresponding to the characters, and a length of each text is variable. If one desires to further add a new text (E) in such a constitution, to add a DIR[E] to the directory, all of the texts (A), (B), (C) and (D) shown in FIG. 3 have to be shifted by twelve bytes. Furthermore, their directories DIR(A) to DIR(D) also have to be updated. The memory mapping of the text memory after updating is shown in FIG. 4. DIR CNT denotes the number of directories.

Thus, the control procedure of the text memory becomes complicated and it takes a long time for processing. This is because the texts (A) to (D) exist behind the directories indicated by DIR(A) to DIR(D); therefore, the conventional text memory has adopted a very inefficient processing method.

SUMMARY OF THE INVENTION

It is a main object of the present invention to eliminate the above-mentioned drawbacks and to provide a memory control unit whereby the rearrangement to change, insert or delete the texts is possible without requiring work memories, thereby remarkably reducing the processing time.

It is another object of the invention to provide a storage device whereby it is not necessary to rearrange other character strings at all even in case of further adding a new character string.

BRIEF DESCRIPTION OF THE DRAWINGS

FIGS. 1, 2, 3, 4 are diagrams to describe a conventional method, in which

FIG. 1 is a block diagram showing a system constitution;

FIG. 2 is an explanatory diagram showing a bit arrangement of a directory;

FIG. 3 is an explanatory diagram showing a constitution of a text memory;

FIG. 4 is an explanatory diagram showing a constitution of the text memory in the case where another text was further added;

FIGS. 5, 6, 7, 8 are diagrams to explain one embodiment of the present invention, in which FIG. 5 is a block diagram showing a whole system constitution;

FIGS. 6, 7, 8 are explanatory diagrams showing constitutions of a text memory according to the present invention;

FIGS. 12, 13, 14 are diagrams to explain another embodiment of the present invention, in which FIGS. 12 and 14 are diagrams showing constitutions of the text memory according to the invention; and FIG. 13 is a flowchart showing the control procedure thereof.

DETAILED DESCRIPTION OF THE PREFERRED EMBODIMENTS

One embodiment of the present invention will now be described with reference to the drawings.

Figure 5:
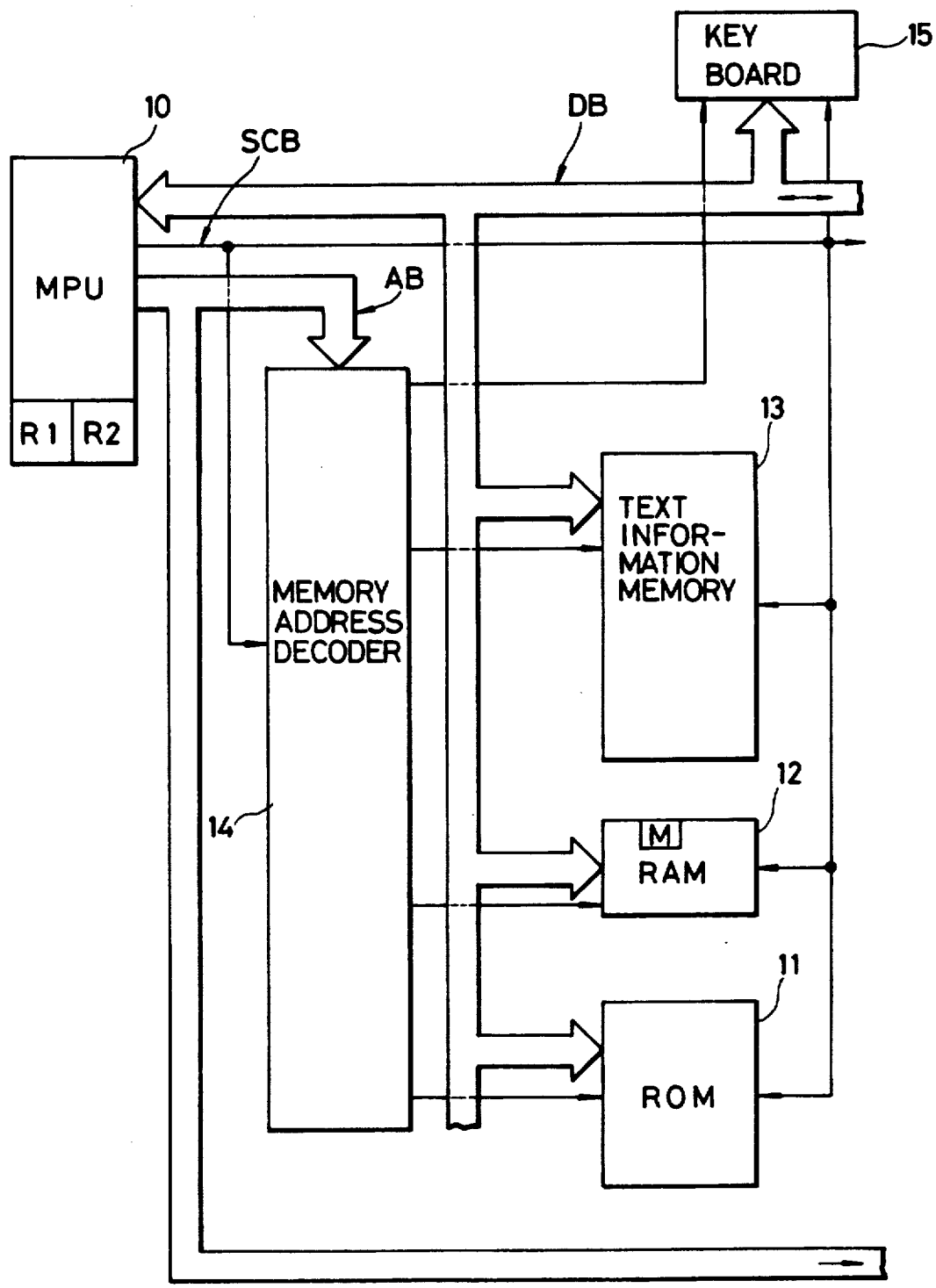

FIG. 5 shows a block diagram of a system to control a character string memory according to the present invention. In the diagram, a reference numeral 10 denotes a microprocessor (hereinbelow, referred to as an MPU); and 11 is a fixed memory (hereinbelow, referred to as an ROM) in which various control procedures of the present apparatus have been preliminarily stored in the formats of control codes. The MPU 10 is connected through a data bus DB to the ROM 11 and performs the memory control and the like which will be described later with reference to the content (control program) of the ROM 11. A random access memory (hereinbelow, referred to as an RAM) 12 is used as a storage section for saving a hardware stack of the MPU 10, namely, the information indicative of the state of the system or the memory information which is temporarily used.

Figure 1:
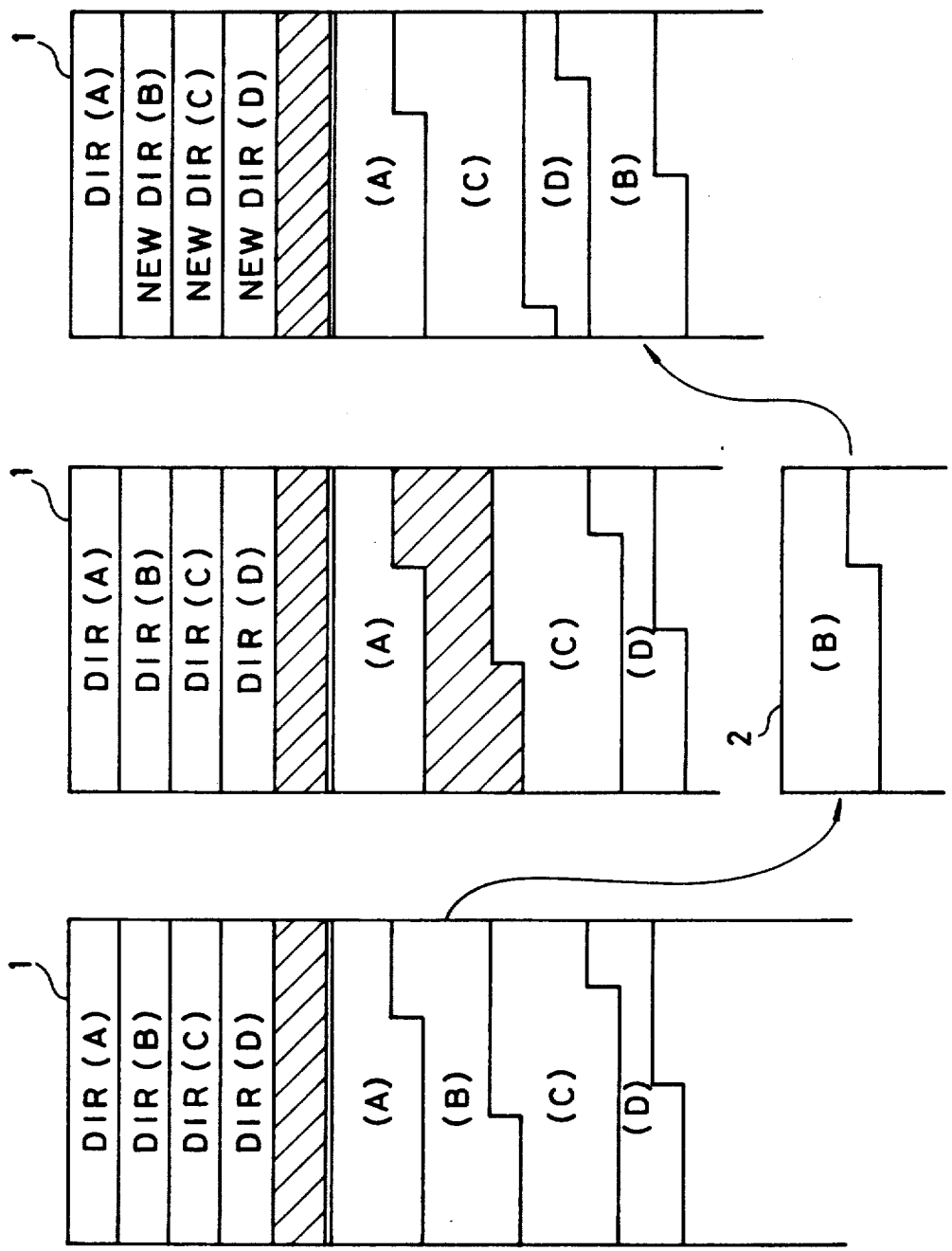

At numeral 13 is a text memory similar to the text memory 1 of FIG. 1 and the control for this memory 13 is executed in the manner as will be described later. A memory address decoder 14 is connected to the MPU 10 through an address bus AB. This decoder 14 decodes the addresses derived through the address bus AB from the MPU 10 and selects respectively the ROM 11, RAM 12 and text memory 13 in response to those decoded values, then it connects the ROM 11, RAM 12 or memory 13 selected to the MPU 10 through the data bus DB. The decoder 14 performs the transmission of the read/write signal for the system control, the transmission of the address information, and the reception/transmission of the data among the respective devices under the control of a system control bus SCB. A numeral 15 indicates a keyboard for inputting information.

FIGS. 6 to 8 show an examples of a constitution of the text memory 13 of FIG. 5.

Figure 9:
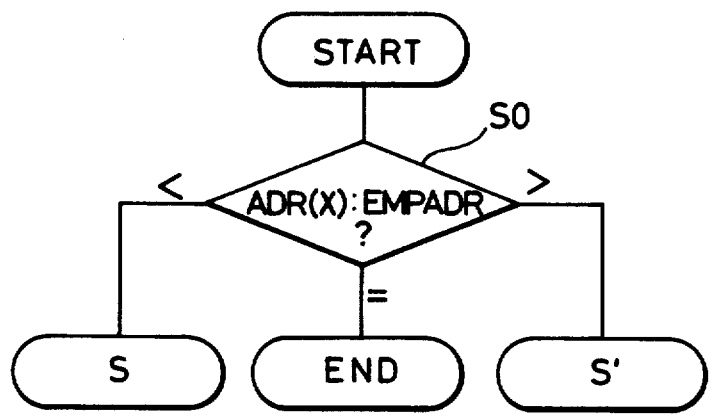
FIGS. 9, 10, 11 are flowcharts showing the control procedure of the text memory control unit of the invention.
Figure 10:
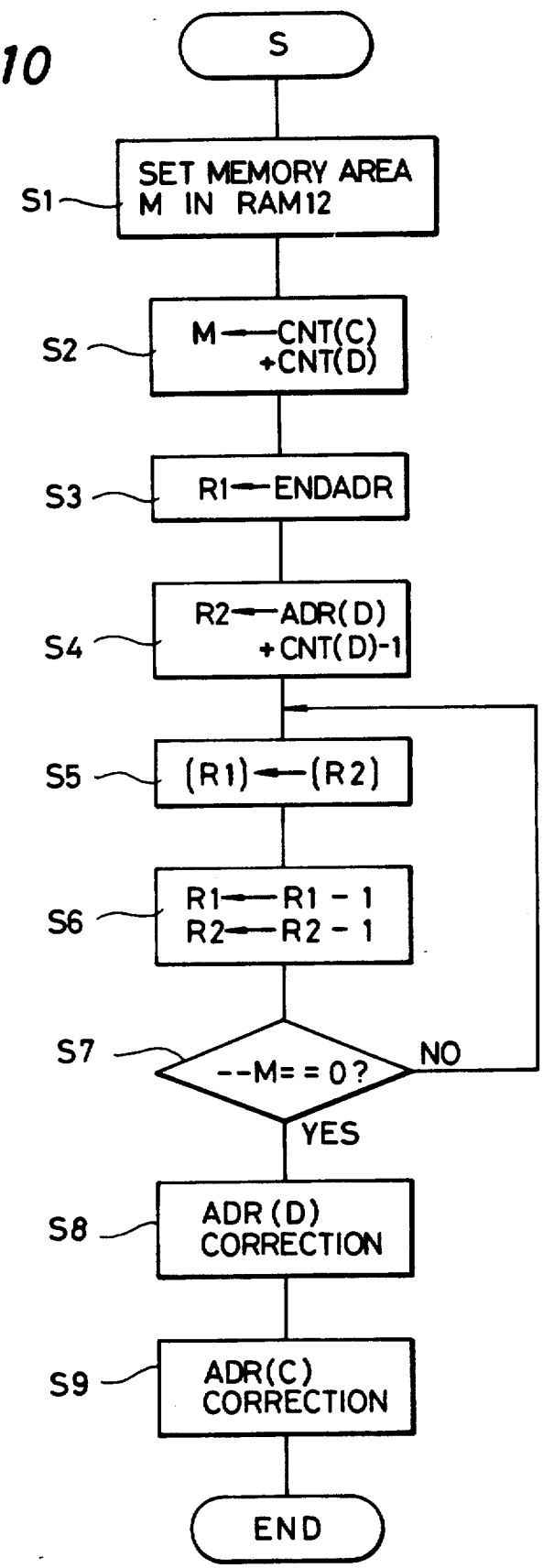
Figure 11:
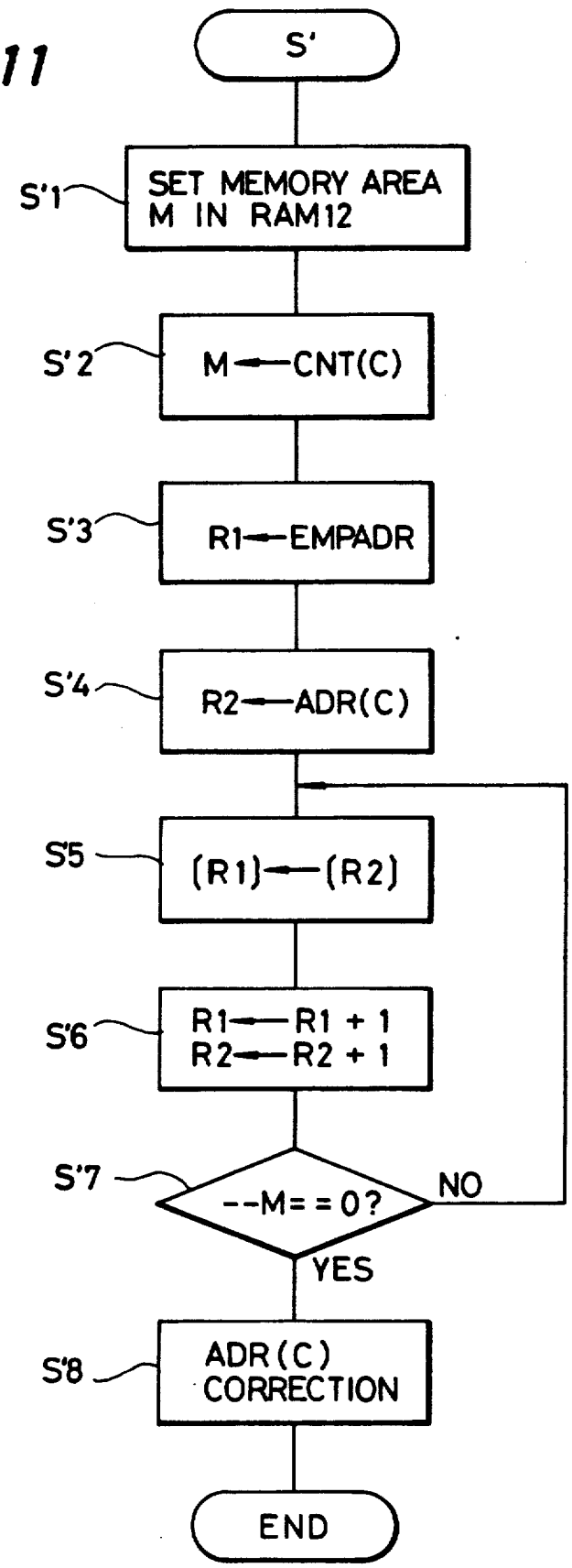

Next, an example of the control operation of the control unit of the invention of FIG. 5 will be explained with reference to a flowchart of FIGS. 9 to 11 showing the control procedure according to the invention. First, in step S0 in FIG. 9, a title name of the text which one desires to change in the text memory 13 is entered by a keyboard 15. Due to this, the head address of the next text (X) of the relevent text information (hereinbelow, this head address is referred to as ADR (X)) and the head address in the empty area of the text information of that text information memory 13 (hereinbelow, this head address is referred, to as EMPADR and has been stored in the RAM 12) are compared. As a result, if ADR(X)<EMPADR, the control procedure shown in FIG. 10 will be executed. On the contrary, if ADR(X)>EMPADR, the control procedure shown in FIG. 11 will be performed. When ADR(X) =EMPADR, since it is unnecessary to perform the rearrangement, the rearrangement processing is not done and the processing advances to the processing procedure to change (not shown).

Figure 2:
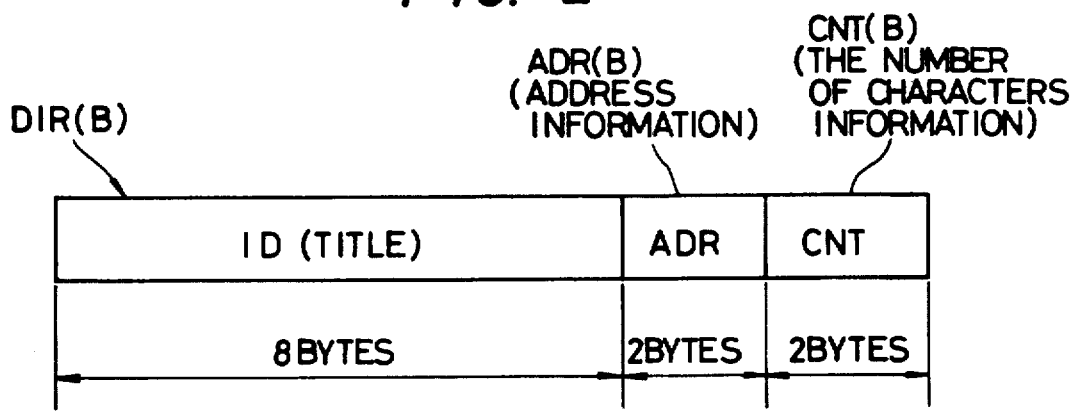
Figure 3:
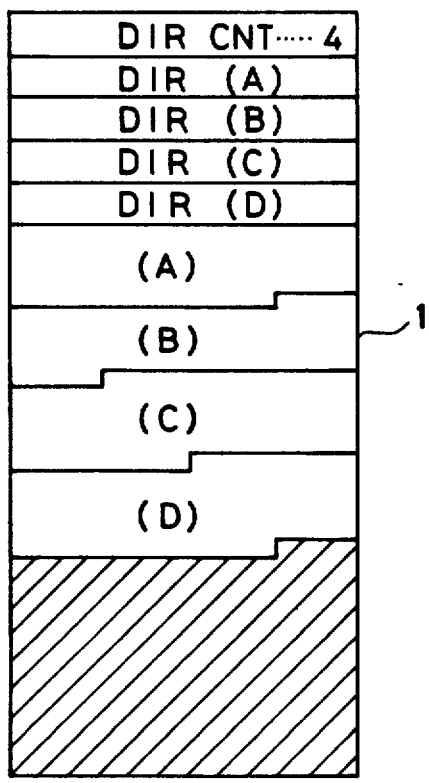
Figure 4:
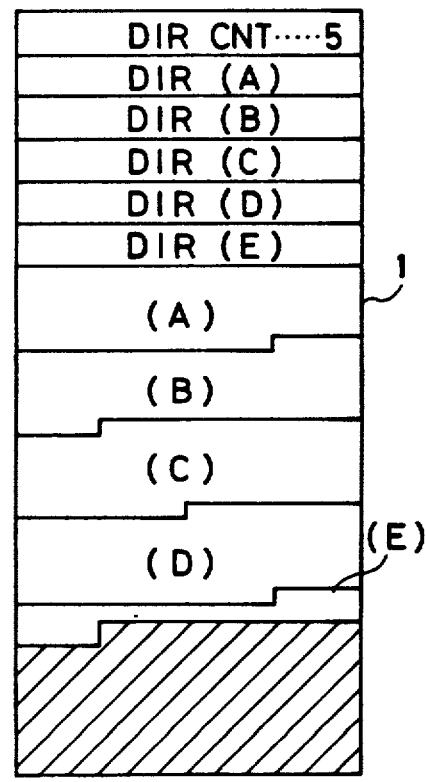

Now, assuming that one desires to change the text (B) when the text memory 13 is in the state as shown in FIG. 6, since ADR(C)<EMPADR as shown in the diagram, the processing advances from step S0 of FIG. 9 to step S1 for the control processing of FIG. 10. In step S1, a memory portion (memory area) M for storing the foregoing CNT (refer to FIG. 2) is set first in the RAM 12. This memory area M will be used to move the text in the following step. Then in step S2, the sum of the CNT in the DIR(D) in FIG. 3 (hereinbelow, referred to as CNT(D)) and the CNT in the DIR(C) (hereinbelow, referred to as CNT(C)), namely CNT(C)+CNT(D) is obtained. This total value is equal to the number of movements of the texts (C) and (D). This value is transferred into the memory M provided in step S1. Then in step S3, a value of the end address in the space area of the text memory 13 (hereinbelow, this end address is referred to as ENDADR) is transferred to an address register R1 provided in the MPU 10. Subsequently, in step S4, the head address of the text (D) (hereinbelow, referred to as ADR(D)) is used and the operation value of (ADR(D)+CNT(D)−1) is transferred to an address register R2 provided in the MPU 10.

After the above processings, the content of the address indicated by the address register R2 is transferred to the address location indicated by the address register R1 in step S5. Then in step S6, values of the address registers R1 and R2 are subtracted by only one, respectively. In next step S7, a value of the number of movements stored in the memory M is subtracted by only one to see if the results is "0" or not, thereby discriminating the completion of the movement of the texts (C) and (D). As a result of this, when ≠0, the processing returns to step S5, so that the data is transferred from the register R2 into the register R1 and at the same time the register R1 and R2 representing its address are corrected in step S6; in this way, the above processings are repeatedly performed. When M =0 is obtained in step S7, it is determined that the transfer of the text has been completed, so that the processing advances to next step S8.

In step S8, a size of the empty area in the text of the text memory 13 (hereinbelow, this size is referred to as EMPBYTE) is used and (ADR(D)+EMPBYTE) is calculated, then the calculation value is transferred to the address ADR(D) of the DIR(D) shown in FIG. 7. In next step S9, the substantially same processing as that in step S8 is executed for the DIR(C) of the text (C). After the above processings, the content of the text memory 13 will be rearranged as shown in FIG. 7. Namely, the empty area (indicated by the hatched portion) is made after the text (B) by these series of rearrangement processing, the insertion and deletion in the text (B) can be executed.

Furthermore, in the case where one desires to change the text (C) in FIG. 7, the processing advances to step S'1 of the control procedure shown in FIG. 9 since it is determined that ADR(D)>EMPADR in step S0 in FIG. 9. First in step S'1, the memory area M is set in the RAM 12 in the similar manner as in the foregoing step S1. Then in step S'2, the CNT(C) is transferred to the memory M. In next step S'3, the head address EMPADR of the empty area in the text memory 13 is transferred to the address register R1 in the MPU 10. Next, after a value of ADR(C) was transferred to the address register R2 in the MPU 10 in step S'4, the processing advances to steps S'5 to S'7.

In steps S'5–S-7, the processings of the contents substantially similar to those in the abovedescribed steps S5 to S7 are executed, respectively, except that the values of the registers R1 and R2 are respectively increased by only one in step S'6 although they were subtracted by only one in step S6. In step S'7, when it is determined that M =0, an operation value of(ADR(C)−EMPBYTE) is transferred to the ADR(C) in next step S'8.

After the above control processings, the text memory 13 is rearranged as shown in FIG. 8, so that the processing advances to the change processing (not shown).

In this way, according to this embodiment, the empty area in the text memory 13 is discriminated to see if it lies before the text which will be changed or not, and when the empty area is located behind that text, the texts subsequent to the text which will be changed is moved backward, thereby shifting the empty area to the location right after the text which will be changed. Or, when the empty area is located before the text which will be changed, the empty area is shifted to the location right behind the text which will be changed by shifting the text which will be changed to the location before the empty area. Therefore, it is possible to perform the rearrangement for the change, insertion or deletion of the texts without requiring a lot of work memories as in the conventional apparatus. As a result, the memories are saved and the edit processing time for the rearrangement and the like can be remarkably reduced.

As described above, according to the present invention, the memory area for transferring the text information is not needed at all and an effect such that an amount of text information moved upon rearrangement is very little is obtained. Due to this, the time required for rearrangement according to the invention is reduced to about 1/6 or less of that in the conventional method. Consequently, in the case where the invention is applied to the electronic typewriter and the like, this enables the typist to operate rapidly.

Figure 12:
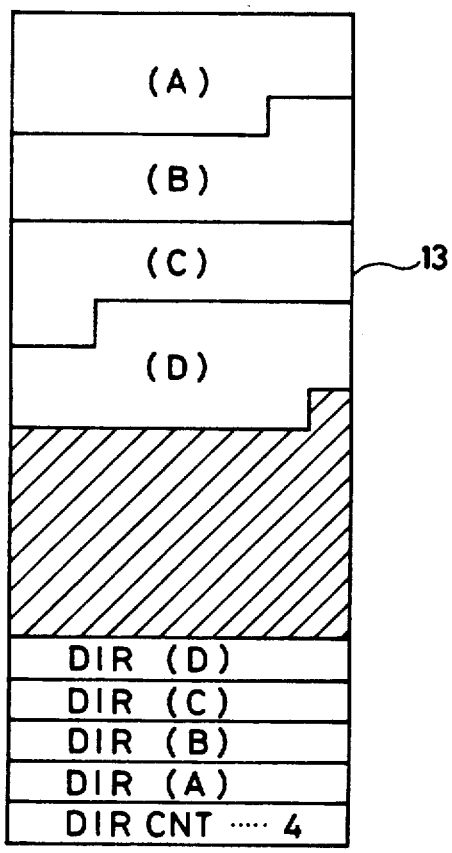
Figure 14:
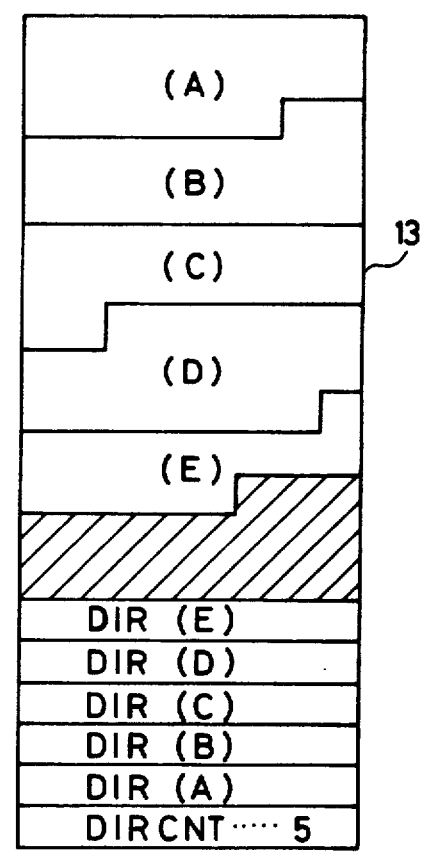
Figure 13:
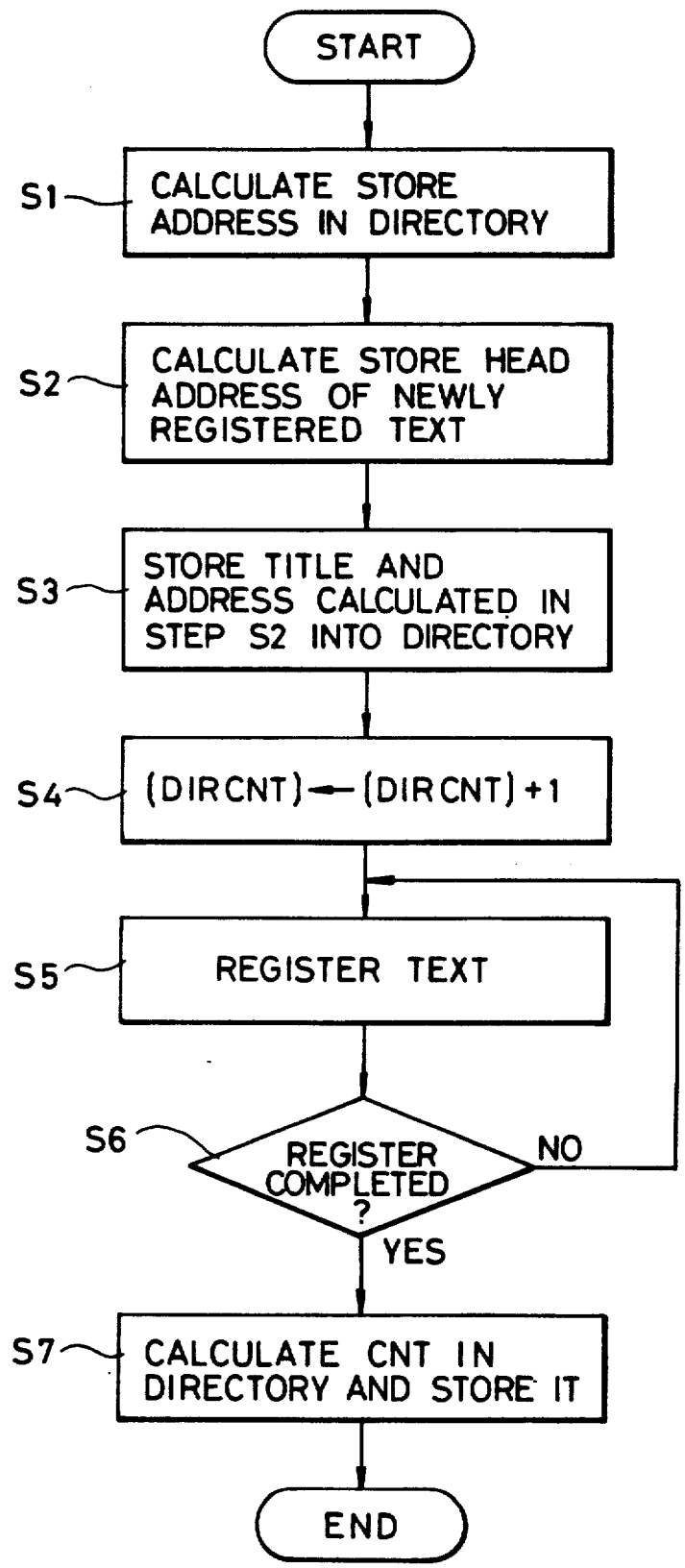

FIGS. 12 to 14 show another embodiment of the present invention. In this embodiment, the text memory 13 is constituted as shown in FIG. 12. Namely, it comprises a memory area DIRCNT indicative of the number of texts, directories DIRs and a section to store the texts in the similar manner as in FIG. 2 expect that they are statically arranged in accordance with the sequence of DIRCNT, DIR(A), DIR(B), DIR(C), and DIR(D) from the physical end address of the title memory 13 different from the sequence in FIG. 2 such that the titles (A) to (D) are arranged right behind the DIR(D). Then, the texts are arranged in the sequence of text (A), text (B), text (C), and text (D) from the physical head address in FIG. 12.

Now, when one desires to add the text (E) in such an arrangement, the control procedure as shown in FIG. 13 is used.

In step S1 first, the storage address of the directory DIR(E) representing the text (E) is obtained on the basis of the physical end address (hereinbelow, referred to as RAMEND) of the text memory 13 as indicated by the following expression (1) (in this case, the first address of the memory is set to one byte).

$$[DIR(E) \text{ start address}] = \{(RAMEND) - 12 \times (DIRCNT) + 1\} - (\text{number of dedicated bytes in the area DIRCNT}) \quad (1)$$

Next in step S2, the head address {ADR(E)} for storing the text (E) is obtained by expression (2).

$$ADR(E) = ADR[DIR(D)] + CNT[DIR(D)] \quad (2)$$

In step S3, the title of eight bytes of the text (E) is first stored sequentially from the address obtained in expression (1), then the head address of two bytes of the text (E) derived in expression (2) is stored. The number of characters information section CNT is not stored here because it is stored after title (E) was all registered. In step S4, the content of the memory area DIRCNT indicative of the number of titles is increased by one and the preparation for registration of the title (E) is ended. Now, the title (E) can be registered.

Thereafter, the title (E) is registered in step S5. Upon completion of the registration (step S6—Y), the number of characters information CNT of the directory DIR(E) is calculated on the basis of the number of characters of the text registered and is stored in the CNT, then the registration of the text (E) is ended (step S7).

Due to the above-mentioned procedure, the text memory 13 has the memory constitution shown in FIG. 14.

By repeatedly performing the similar procedure, the registration of the new text such as a text (F) and a text (G) can be added without performing any arrangement of the texts.

As described above, the rearrangement of the texts is not performed at all when newly registering the text; therefore, the memory such as a text transferring buffer which is ordinarily hardly used is unnecessary. Also, even in the case where the power supply instantaneously breaks or the like, the memory content is not broken in association with the movement of the character string. Thus, very efficient electronic equipment such as electronic typewriters and the like are realized.

What I claim is:

1. A memory control unit for controlling a memory containing texts to be edited comprising:
   first memory means for storing a plurality of texts having respective information;
   second memory means for storing the amount of the information for each text;
   read means for reading the amount of the information of one text adjacent to one of the plurality of texts to be edited from said second memory means;
   determining means for determining, in response to the amount of the information read by said read means, whether or not the adjacent text adjacent to the one text to be edited is capable of being moved to another area of said first memory means; and
   control means connected to said first memory means, in response to the determining by said determining means, for moving the adjacent text to said another area such that an area in which the adjacent text was originally stored can be used as an editing area for the one text to be edited.

2. A memory control unit according to claim 1, wherein said first and second memory means constitute one memory.

3. A memory control unit according to claim 1, wherein said second memory means includes an area for storing titles of the plurality of texts.

4. A memory control unit according to claim 1, wherein said control means includes a microprocessor.

5. A memory control unit according to claim 1, further comprising third memory means for storing the amount of the information read by said read means.

6. A memory control unit according to claim 1, wherein said first memory means comprises a random access memory.

7. A memory control unit according to claim 1, wherein said second memory means comprises a random access memory.

8. A memory control unit according to claim 1, wherein said determining means comprises a microprocessor unit.

9. A memory control unit according to claim 1, wherein said control means comprises a micro-processor unit.

10. A memory control unit according to claim 1, further comprising keyboard means for inputting index information for each text.

11. A memory control unit according to claim 10, further comprising means for activating said determining means in response to the index information input by said keyboard means.

12. A memory control unit according to claim 10, further comprising means for activating said determining means in response to the index information input by said keyboard means and then activating said control means.

13. A information storage apparatus comprising:
memory means having a plurality of storage positions for storing a plurality of character trains, the storage positions being assigned associated sequential addresses;
a directory section for storing for each character train stored in said memory means, headline information, storage position information indicating the location of the character train in said memory means, and character number information indicating the number of characters in the character train;
determining means for determining, when a desired one of the character trains in said memory means is to be updated, the location of an unused storage area with respect to the position of the desired character train on the basis of the storage position information and the character number information; and
control means for controlling an unused storage area to be set subsequently to the position of the desired character train by moving in sequence some character trains adjacent to the desired character train to an unused storage area or by moving the desired character train, in response to a determination by said determination means, the storage position information, and the character number information.

14. A memory control unit comprising:
memory means for storing a plurality of character trains, said memory means having a plurality of storage areas, wherein a prescribed sequence of addresses are assigned to respective storage areas;
directory means, for storing an index for each character train stored in said memory means and for storing, for each index, area information indicating in which one of the storage areas its associated character train is stored and character number information indicating the number of characters included int he associated character train;
determining means for determining, when a desired one of the plurality of character trains stored in said memory means is to be updated, the position of an unused storage area in said memory means with respect to an area in which the desired character train is stored, in response to the area information and the character number information stored in said directory means; and
control means for controlling said unit such that the current storage area for the desired character train and its subsequent storage area are assigned as a new storage area for the desired character train by sequentially moving some character trains subsequent to the desired character train in said memory means to the unused storage area in response to the determination by said determining means and the area information and the character number information.

15. A memory control unit according to claim 14, wherein said memory means comprises a random access memory.

16. A memory control unit according to claim 14, wherein said directory means comprises a random access memory.

17. A memory control unit according to claim 14, wherein said determining means comprises a microprocessor unit.

18. A memory control unit according to claim 14, wherein said control means comprises a micro-processor unit.

19. A memory control unit according to claim 14, further comprising a keyboard means for inputting the index.

20. A memory control unit according to claim 19, further comprising means for activating said determining means in response to the index input by said keyboard means.

21. A memory control unit according to claim 19, further comprising means for activating said determining means in response to the index input by said keyboard means and then activating said control means.

22. A memory of enlarging an editing and storing area of a desired character train in an information processing system having memory means, for storing a plurality of character trains, having a plurality of storage areas to which a prescribed sequence of addresses are respectively assigned, and directory means for storing an index for each character train stored in the memory means and for storing, for each index, area information indicating in which one of the storage areas its associated character train is stored and character number information indicating the number of characters included in the associated character train, said method comprising the steps of:
determining, when a desired one of the plurality of character trains stored in the memory means is to be updated, the position of an unused storage area in the memory means with respect to an area in which the desired character train is stored, in response to the area information and the character number information stored in the directory means; and
assigning the current storage area of the desired character train and its subsequent storage area as a new storage area for the desired character train by sequentially moving some character trains subsequent to the desired character train in the memory means to the unused storage area in response to the determining in the determining step and the area information and the character number information.

23. A memory according claim 22, further comprising the steps of inputting the index into the information processing system with keyboard means and enabling the performing of the determining step in response to the index input by the keyboard means.

24. A memory according to claim 23, further comprising the step of enabling the performing of the assigning step after the enabling of the performing of the determining step in response to the index input by a keyboard means.

* * * * *

UNITED STATES PATENT AND TRADEMARK OFFICE
CERTIFICATE OF CORRECTION

PATENT NO. : 5,157,784         Page 1 of 2
DATED       : October 20, 1992
INVENTOR(S) : MASAKI NISHIYAMA It is certified that error appears in the above-identified patent and that said Letters Patent is hereby corrected as shown below: On the title page, Item

[54] TITLE    and COLUMN 1, line 3

Line 3, "TEST SPACE" should read --TEXT SPACE--.

COLUMN 1

Line 3, "TEST SPACE" should read --TEXT SPACE--.

COLUMN 2

Line 12, "DIR[E)" should read --DIR(E)--.

COLUMN 3

Line 38, "an" should be deleted.
    Line 51, "referred," should read --referred--.

COLUMN 7

Line 53, "int he" should read --in the--.

UNITED STATES PATENT AND TRADEMARK OFFICE
CERTIFICATE OF CORRECTION

PATENT NO. : 5,157,784

DATED : October 20, 1992

INVENTOR(S) : MASAKI NISHIYAMA

It is certified that error appears in the above-identified patent and that said Letters Patent is hereby corrected as shown below:

```
COLUMN 8, line 28, "memory" should read --method --.
         line 57, "memory" should read --method --.
         line 62, "memory" should read --method --.
```

Signed and Sealed this

Seventh Day of December, 1993

*Attest:*

BRUCE LEHMAN

*Attesting Officer*　　　*Commissioner of Patents and Trademarks*